Patented Dec. 1, 1925.

1,563,673

UNITED STATES PATENT OFFICE.

ERNEST AUGUSTE GEORGE STREET, OF LEVALLOIS-PERRET, FRANCE, ASSIGNOR TO SOCIÉTÉ ANONYME LE CARBONE, OF LEVALLOIS-PERRET, FRANCE.

PROCESS FOR IMPERMEABILIZING SUBSTANCES FOR ABSORBING GAS.

No Drawing.　　Application filed June 30, 1922.　Serial No. 571,926.

*To all whom it may concern:*

Be it known that I, ERNEST AUGUSTE GEORGE STREET, of 12 and 33 Rue de Lorraine, Levallois-Perret, Seine, in the Republic of France, have invented Processes for Impermeabilizing Substances for Absorbing Gas, of which the following is a full, clear, and exact description.

This invention has for its object a method of protection, against the penetration by liquids, of porous bodies when they are immersed in these liquids and particularly porous bodies of electrodes of batteries and electrolyzing apparatuses.

This method of protection is essentially characterized by the application on the surface of these porous bodies of an adherent coating constituted by a pectized nonmetallic colloid.

The invention consists substantially in preparing a nonmetallic colloidal suspension suitable for the solution in which the porous body is adapted to be immersed and in bringing this colloidal suspension to such a degree of concentration that by the simple immersion of the porous body in this suspension, there is nearly instantaneously formed, at the surface of this porous body, owing to its absorbing properties, a coagulum which dries up immediately from one place to another until pectization.

This pectized coagulum, that is to say being no longer capable of redissolving in the suspension which has produced it, is formed with such a rapidity that it immediately constitutes, on the surface of the porous body, with an extremely small penetration, a liquid-tight film, stopping immediately any afflux of the suspension in the mass of the porous body and thus protecting the latter against any subsequent penetration by the liquid in which will be immersed.

Owing to the rapidity with which is formed the coagulum and to its immediate pectization, the porous body is therefore immediately isolated from the collodial suspension and the duration of the immersion is without influence on the thickness of the film; consequently in the case of a more or less prolonged immersion, a film-like coating always extremely thin, can only be produced, without penetration of colloidal material in the mass of the porous body; therefore, the latter always maintains its properties of absorption and adsorption of the gases.

The present invention is particularly applicable for covering porous bodies of the positive electrodes of certain types of batteries, with a film-like coating, in such conditions that the porous carbon stick is protected against the access of the water of the electrolyte whilst maintaining an internal resistance as small as possible owing to the excessively small thickness of the pectized colloid which covers it.

By way of indication, several methods of carrying out the process forming the subject-matter of the invention will be given hereafter.

One method of carrying out the process consists in diluting 1.4 kg. of arrow-root in two litres of water, then pouring this dilution into eighteen litres of water heated at a temperature of about 80° C. The whole is stirred and the said temperature is maintained until yellowish-brown spots appear in the liquid. At this moment the heating is stopped and the liquid is transferred into a nonheated vessel.

When the temperature has fallen to about 70° C., the colloidal suspension thus obtained is at the required degree of concentration. The porous body is then plunged in this colloidal suspension and is left immersed therein for approximately three quarters of an hour.

During this immersion, the external part of the porous body, becomes impregnated with colloidal suspension and the portion of this substance thus absorbed is immediately dehydrated, owing, on the one hand, to its degree of concentration and, on the other hand, to the absorbing properties of the porous body and forms a coagulum which dries up immediately from place to place until pectization.

This pectized coagulum, thus formed in a very short time at the surface of the porous body, constitutes a tight coating which stops the penetration of the colloidal suspension in the porous body, so that the duration of the immersion is practically without influence on the thickness of this coating.

The porous bodies thus covered with their tight-coatings are then removed from the colloidal suspension and left to dry.

The film-like layer of pectized colloid which covers these porous bodies, subsequently protects them in a complete manner against any penetration of water.

The present process may also be carried out by means of colloidal suspensions containing from 2 to 5% of hydrated silica. By operating as above indicated, a coating is obtained which is constituted by a film-like layer of pectized silica.

Pectization of aqueous silica is preceded by a thickening of the liquid which forms the suspension; upon its gelatinization this liquid flows as oil. If, at this moment, the porous body is immersed, the portion of the suspension in contact with the same, owing to the absorption of the water it contains, is dehydrated and forms a pectized coagulum which covers the porous body as previously stated. By allowing this coating to gradually dry in the air, it is finally transformed into a hard material.

It is also possible to use, as material capable of constituting the colloidal suspension, fish glue which gives the same result.

Another method consists in using potato flour in the following conditions:

1.4 kg. potato flour is mixed with two litres of water, and this dilution is poured into an emulsion, containing eighteen litres of water and 360 grams of glycerine, heated at a temperature of about 60° C. This temperature is maintained and stirring is effected during the mixing operation. The whole is then left to cool down to 55° C. and at this moment the porous body to be coated is immersed. The immersion must last for about 30 to 45 minutes, after which the product is left to dry in the atmosphere.

Generally speaking, an addition of gylcerine in the suspension, in the proportion for instance of 20 to 30 grams per litre of suspension, has for effect to retard the pectization and to avoid cracks in the pectized colloid.

The methods of operation above described are given by way of example only and it is to be understood that it is possible to employ any other nonmetallic materials, in suitable proportions, capable of constituting a pectized colloidal suspension which can form, on a porous body, a tight film-like coating as above stated.

Claims:—

1. A process for impermeabilizing gas absorbing substances and particularly porous electrode substances for batteries and electrolyzers consisting in applying on the porous body a non-metallic colloidal solution, in concentrated state, so that, by reason of the adsorbent properties of the porous body, the slight quantity of uncombined water contained in the colloidal layer may be absorbed and that the latter will form a pectized covering impenetrable to liquids.

2. A process for impermeabilizing gas absorbing substances and particularly porous electrode substances for batteries and electrolyzers, said process consisting in preparing a non-metallic colloidal suspension; bringing this suspension to a concentrated state; immersing the porous body in this suspension; then finally allowing the porous body covered with this colloidal covering to dry, so that the colloidal suspension contacting with the porous body, on the one hand by reason of its concentration, and on the other, of the adsorbent properties of this porous body, are dehydrated to gelatinization and forms a covering (coagulum) which covers the porous body and which gradually dries to pectization.

3. A process for rendering porous bodies, and particularly those of battery and electrolyzer electrodes, impermeable to liquids, said process consisting in preparing a non-metallic colloidal suspension; bringing this suspension to a concentrated state; applying said latter on the porous body; then finally allowing the porous body covered with this colloidal covering to dry, so that the colloidal suspension contacting with the porous body, on the one hand by reason of its concentration, and on the other, of the adsorbent properties of this porous body, are dehydrated to gelatinization and forms a covering (coagulum) which covers the porous body and which gradually dries to pectization.

4. A process for impermeabilizing gas absorbing substances and particularly porous electrode substances for batteries and electrolyzers, said process consisting in preparing a colloidal suspension by means of a vegetable material, such as starch, at a temperature sufficiently high to obtain the desired degree of concentration; allowing this colloidal suspension to cool to a temperature at which it is still liquid; immersing the porous body in said suspension; then after an immersion of about 30 to 45 minutes, withdrawing said porous body covered with its colloidal coating; and finally allowing it to dry.

5. A process in accordance with claim 1, characterized in that glycerine is added to the colloidal solution for the purpose of retarding pectization and to prevent cracks in the coating formed by the pectized colloid.

6. A process for impermeabilizing gas absorbing substances and particularly porous electrode substances for batteries and electrolyzers, said process consisting in preparing a colloidal suspension by means of a vegetable material, such as starch, at a temperature sufficiently high to obtain the desired degree of concentration; adding glycerine to such colloidal suspension; allowing the mixture to cool to a temperature at which it is still liquid, immersing the porous body in said colloidal mixture; then, after about 30 to 45 minutes immersion, withdrawing the porous body covered with its colloid coating; and finally allowing it to dry.

7. A process for impermeabilizing gas absorbing substances and particularly porous electrode substances for batteries and electrolyzers, consisting in applying to the surface of the porous body to come in contact with the liquid a collodial, non-metallic, pectizable, that is capable of assuming a high degree of polymerization, solution, and in a state of concentration such that, through the adsorbent action of the porous body, the small amount of uncombined water contained in the colloidal solution will be absorbed and that this colloidal solution is pectized on the surface of the porous body forming a horn-like superficial coating through which liquids can not penetrate.

8. A process for impermeabilizing gas absorbing substances and particularly porous electrode substances for batteries and electrolyzers, consisting in preparing a colloidal, non-metallic, pectizable solution, applying said latter on the porous body, then finally allowing the porous body covered with this colloidal coating to dry, so that the colloidal solution in contact with the porous body, on the one hand by reason of its concentration and on the other on account of the adsorbent properties of this porous body, is dehydrated and forms a coagulum which encompasses the porous body and which dries at once gradually to pectization.

9. A process for impermeabilizing gas absorbing substances and particularly porous electrode substances for batteries and electrolyzers, consisting in preparing a colloidal, non-metallic, pectizable solution, bringing this solution to a concentrated state, immersing the porous body in said concentrated, colloidal, pectizable solution, and then finally permitting the porous body covered with the colloidal coating to dry, in such manner that the collodial solution in contact with the porous body, on the one hand by reason of its concentration and on the other by reason of the absorbent properties of this porous body, is dehydrated and forms a coagulum which encompasses the porous body and which dries by degrees immediately until pectized.

10. A process of impermeabilizing gas absorbing substances and particularly porous electrode substances for batteries and electrolyzers, consisting in preparing a colloidal, pectizable suspension by means of a vegetable material, such as starch, at a temperature sufficiently high to obtain this suspension in concentrated form, in allowing this colloidal suspension to cool to a temperature at which it is still liquid, immersing the porous body in said colloidal, pectizable suspension, then, after this immersion, withdrawing the porous body covered with its colloidal coating, and finally drying it.

The foregoing specification of my liquid-tight coating on porous bodies, particularly applicable on the porous bodies of electrodes of batteries or electrolyzing apparatuses, signed by me this 16th day of June 1922.

ERNEST AUGUSTE GEORGE STREET.